United States Patent Office 3,527,830
Patented Sept. 8, 1970

3,527,830
PREPARATION OF OLEFINIC
HYDROCARBONS
Robert A. Dombro, Chicago, Ill., assignor to Universal Oil Products Company, Des Plaines, Ill., a corporation of Delaware
No Drawing. Filed Sept. 19, 1968, Ser. No. 760,984
Int. Cl. C07c 11/02, 149/00
U.S. Cl. 260—677                                                  10 Claims

ABSTRACT OF THE DISCLOSURE

Olefinic hydrocarbons may be prepared by treating an organic sulfide in the presence of a primary, secondary or tertiary amine and a transition metal catalyst at elevated temperatures.

---

This invention relates to a process for recovering or preparing olefinic hydrocarbons utilizing organic sulfides as the starting material. More particularly, the invention is concerned with a process for preparing olefinic hydrocarbons by treating organic sulfides at elevated temperatures in the presence of certain compounds of a type hereinafter set forth in greater detail, said olefinic hydrocarbon preparation being accomplished without the attendant isomerization of the olefin during the formation thereof.

Olefinic hydrocarbons, and particularly olefinic hydrocarbons which are normal in configuration, will find a wide variety of uses in the chemical field. For example, propylene is useful in the preparation of isopropyl alcohol, propylene dimer and trimer, polypropylene, etc.; 1-butene is used in preparing polymer and alkylate gasoline; 1-hexene and 1-heptene are used in the synthesis of flavors, perfumes, medicines, dyes and resins; 1-nonylene is used as a wetting agent or as a lube oil additive; 1-decylene is used in pharmaceuticles, dyes, oils and resins, etc. In addition, normal olefins, containing from 12 to about 16 carbon atoms which are terminal in nature such as 1-dodecene, 1-tetradecene, 1-hexadecene, etc., will find a special use as an alkylate for biodegradable detergents. This is of particular importance inasmuch as one of the major problems which is prevalent in cities, towns, villages, etc., is the disposal of sewage and the inactivation of detergents which are dissolved in the sewage in even small quantities. Such disposal problems are especially vexacious in the case of those detergents having an alkylaryl structure as the nuclear portion of the detergent molecule. These detergents, when the alkyl portion of the structure is branched-chain in nature, will produce stable foams in hard or soft waters in such large quantities that the foam clogs sewage treatment facilities and often appears in sufficient concentration in such facilities to destroy the bacteria which are necessary for sufficient biological action for the proper sewage treatment. Inasmuch as the alkyl portion is branched-chain in nature, it is not susceptible to action by the bacteria and is not biodegradable in nature. Therefore, the detergent persists in solution and is carried into the sewage treatment plant in substantially unchanged or still-active form. Having an abiding tendency to foam, especially when mixed with aerating devices and stirrers, large quantities of foam are discharged from the sewage digestion plant into rivers and streams where the continuing presence of the detergent is marked by large billows of foam on the surface. These foams or still-active detergent solutions often enter sub-surface water currents which feed into underground water strata from which many communities draw their water supplies and these detergents find their way into the water supplies drawn from the water taps in homes, hospitals, schools, and places of business. Occasionally, these detergents turn up in sufficient quantities in tap water to make drinking water foam as it pours from the tap. However, it is possible to prepare detergents which are biodegradable in nature, said detergents containing an alkyl side-chain which is normal in configuration. By possessing this normal configuration, the alkyl chain is susceptible to action by the bacteria, which by not possessing any interfering substituents will destroy the side chain and thus render the detergent inactive.

It is therefore an object of this invention to provide a process for preparing olefinic hydrocarbons.

A further object of this invention is to provide a process for preparing olefinic hydrocarbons which are normal in configuration and which possess a terminal olefinic linkage.

In one aspect, this invention relates to a process for the preparation of an olefinic hydrocarbon which comprises treating an organic sulfide at an elevated temperature in the range of from about 250° C. to about 400° C. in the presence of an amine compound and a catalyst containing a transition metal, and recovering the resultant olefinic hydrocarbon.

A further aspect of this invention is found in a process for the preparation of an olefinic hydrocarbon which comprises treating n-octyl phenyl sulfide at a temperature in the range of from about 250° C. to about 400° C. in the presence of piperidine and a catalyst comprising nickel composited on kieselguhr, and recovering the resultant 1-octene.

Other objects and embodiments will be found in the following further detailed description of the present invention.

As hereinbefore set forth, the present invention is concerned with a process for treating organic sulfides at elevated temperatures in the presence of certain compounds whereby said sulfide is subjected to pyrolysis and converted thereby to an olefinic hydrocarbon without any isomerization of the olefin occurring during the formation thereof. The process is effected by treating said organic sulfide at an elevated temperature in the range of from about 250° C. to about 400° C., said treatment being effected in the presence of an amine compound which may be primary, secondary or tertiary in nature and a catalyst containing a metal, preferably of the transition series. The organic sulfide will possess the generic formula:

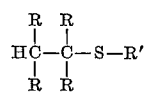

in which the R radicals may be identical or dissimilar in nature, at least one R being alkyl. The remaining R radicals and the R' radical may be selected from the group consisting of hydrogen, alkyl, cycloalkyl, aryl, aralkyl, alkaryl and heterocyclic radicals.

The amine compounds which may be used will include pyrazole, triazole, pyridine, the isomeric diazines, such as pyridazine, pyrimidine, piperazine, the isomeric triazines, piperidine, methyl amine, dimethyl amine, trimethyl amine, ethyl amine, propyl amine, butyl amine, aniline, quinoline carbazole, indole, morpholine, etc.

Metal containing catalysts which may be used comprise those containing a transition metal including iron, cobalt, nickel, platinum, palladium, ruthenium, rhodium, osmium, iridium, either per se or composited on a solid support. These solid supports may include metal oxides, either synthetic or naturally occurring in nature, such as silica, alumina, silica-alumina, kieselguhr, or clays such as montmorillonite, etc. It is also contemplated within the scope of this invention that the transition metals may also be utilized in the form of complexes such as metal acetonyl acetonates includiny iron acetonyl acetonate, cobalt acetonyl acetonate, nickel acetonyl acetonate, etc.

Examples of organic sulfides which may be treated according to the process of this invention are those which possess the generic formula hereinbefore set forth. Some specific examples of these sulfides will include n-butyl methyl sulfide, the isomeric pentyl methyl sulfides, the isomeric hexyl methyl sulfides, the isomeric heptyl methyl sulfides, the isomeric octyl methyl sulfides, the isomeric nonyl methyl sulfides, the isomeric decyl methyl sulfides, the isomeric undecyl methyl sulfides, the isomeric dodecyl methyl sulfides, the isomeric tridecyl methyl sulfides, the isomeric tetradecyl methyl sulfides, the isomeric pentadecyl methyl sulfides, the isomeric hexadecyl methyl sulfides; n-butyl ethyl sulfide, the isomeric pentyl ethyl sulfides, the isomeric hexyl ethyl sulfides, the isomeric heptyl ethyl sulfides, the isomeric octyl ethyl sulfides, the isomeric nonyl ethyl sulfides, the isomeric decyl ethyl sulfides, the isomeric undecyl ethyl sulfides, the isomeric dodecyl ethyl sulfides, the isomeric tridecyl ethyl sulfides, the isomeric tetradecyl ethyl sulfides, the isomeric pentadecyl ethyl sulfides, the isomeric hexadecyl ethyl sulfides; n-butyl phenyl sulfide, the isomeric pentyl phenyl sulfides, the isomeric hexyl phenyl sulfides, the isomeric heptyl phenyl sulfides, the isomeric octyl phenyl sulfides, the isomeric nonyl phenyl sulfides, the isomeric decyl phenyl sulfides, the isomeric undecyl phenyl sulfides, the isomeric dodecyl phenyl sulfides, the isomeric tridecyl phenyl sulfides, the isomeric tetradecyl phenyl sulfides, the isomeric pentadecyl phenyl sulfides, the isomeric hexadecyl phenyl sulfides; n-butyl benzyl sulfide, the isomeric pentyl benzyl sulfides, the isomeric hexyl benzyl sulfides, the isomeric heptyl benzyl sulfides, the isomeric octyl benzyl sulfides, the isomeric nonyl benzyl sulfides, the isomeric decyl benzyl sulfides, the isomeric undecyl benzyl sulfides, the isomeric dodecyl benzyl sulfides, the isomeric tridecyl benzyl sulfides, the isomeric tetradecyl benzyl sulfides, the isomeric pentadecyl benzyl sulfides, the isomeric hexadecyl benzyl sulfides; n-butyl cyclopentyl sulfide, the isomeric pentyl cyclopentyl sulfides, the isomeric hexyl cyclopentyl sulfides, the isomeric heptyl cyclopentyl sulfides, the isomeric octyl cyclopentyl sulfides, the isomeric nonyl cyclopentyl sulfides, the isomeric decyl cyclopentyl sulfides, the isomeric undecyl cyclopentyl sulfides, the isomeric dodecyl cyclopentyl sulfides, the isomeric tridecyl cyclopentyl sulfides, the isomeric tetradecyl cyclopentyl sulfides, the isomeric pentadecyl cyclopentyl sulfides, the isomeric hexadecyl cyclopentyl sulfides; n-butyl cyclohexyl sulfide, the isomeric pentyl cyclohexyl sulfides, the isomeric hexyl cyclohexyl sulfides, the isomeric heptyl cyclohexyl sulfides, the isomeric octyl cyclohexyl sulfides, the isomeric nonyl cyclohexyl sulfides, the isomeric decyl cyclohexyl sulfides, the isomeric undecyl cyclohexyl sulfides, the isomeric dodecyl cycloheyl sulfides, the isomeric tridecyl cyclohexyl sulfides, the isomeric tetradecyl cyclohexyl sulfides, the isomeric pentadecyl cyclohexyl sulfides, the isomeric hexadecyl cyclohexyl sulfides; n-butyl p-tolyl sulfide, the isomeric pentyl p-tolyl sulfides, the isomeric hexyl p-tolyl sulfides, the isomeric heptyl p-tolyl sulfides, the isomeric octyl p-tolyl sulfides, the isomeric nonyl p-tolyl sulfides, the isomeric decyl p-tolyl sulfides, the isomeric undecyl p-tolyl sulfides, the isomeric dodecyl p-tolyl sulfides, the isomeric tridecyl p-tolyl sulfides, the isomeric tetradecyl p-tolyl sulfides, the isomeric pentadecyl p-tolyl sulfides, the isomeric hexadecyl p-tolyl sulfides; etc. Mercaptans (where R'=hydrogen in the generic formula) are also considered within the scope of this invention. It is to be understood that the aforementioned organic sulfides are only representative of the class of compounds which may be treated according to the hereinbefore described process, and that the present invention is not necessarily limited thereto.

The process of the present invention may be effected in any suitable manner and may comprise either a batch or continuous type operation. When a batch type operation is used, a quantity of the organic sulfide of the type hereinbefore set forth in greater detail is placed in an appropriate apparatus such as, for example, a flask or, if superatmospheric pressures are to be used, an autoclave of the rotating or mixing tye. It is contemplated within the scope of this invention that pressures ranging from atmospheric up to about 100 atmospheres or more may be used, the superatmospheric pressures being afforded by introducing a substantially inert gas such as nitrogen into the reaction vessel until the desired operating pressure has been reached. The desired operation pressure will be that which is sufficient to maintain a major portion of the reactants in the liquid phase. In addition, the reaction vessel will also contain the amine compound and the catalyst containing a transition metal. If superatmospheric pressures are to be employed, the reaction vessel is sealed and pressured until the desired operating pressure has been reached. Thereafter, the vessel is heated to a temperature in the range hereinbefore set forth, that is, from about 250° to about 400° C. The reaction is allowed to proceed for a predetermined residence time which may range from about 0.5 up to about 10 hours or more in duration. Upon completion of the desired residence time, heating is discontinued, the vessel and contents thereof are allowed to return to room temperature and any excess pressure is discharged. The reaction mixture is recovered and separated from the catalyst by filtration. Following this, the reaction mixture is then treated by any means known in the art, such as fractional distillation, crystallization, etc., whereby the desired olefin is separated from the amine compound and the organic sulfide which still remains.

It is also contemplated within the scope of this invention that the reaction may be effected in a continuous manner of operation. When this type of operation is used, the organic sulfide is continuously charged to a reaction zone which is maintained at the proper operating conditions of temperature and pressure. In addition, the vessel will also contain the desired catalyst containing a transition metal. The amine compound may be charged through a separate line or, if so desired, it may be admixed with the organic sulfide prior to entry into said reactor and the mixture charged thereto in a single stream. Upon completion of the desired residence time, the reactor effluent is continuously withdrawn and subjected to separation means whereby the desired olefin is recovered while any unreacted starting materials such as the organic sulfide and the amine are recycled to form a portion of the feed stock. When utilizing a transition metal per se or a transition metal which is composited on a solid support, the continuous manner of operation may be effected by utilizing the catalyst as a fixed bed in the reactor, the amine compound and the organic sulfide being passed through said bed in either an upward or downward flow. In addition, the catalyst may be employed in a moving bed type of operation whereby the catalyst and the reactants are passed through the reaction zone either concurrently or countercurrently to each other. Yet another type of operation which may be used comprises the slurry type in which the catalyst is carried into the reactor as a slurry in the organic sulfide.

Examples of olefinic hydrocarbons which may be prepared according to the process of this invention will include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 2-butene, 2-pentene, 3-pentene, 2-hexene, 3-hexene, 2-heptene, 3-heptene, 4-heptene, the isomeric octenes, nonenes, decenes, undecenes, etc.; 4-phenyl-1-butene, 5-phenyl-1-pentene, 6-phenyl-1-hexene, 7-phenyl-1-heptene, 8-phenyl-1-octene, 4-cyclohexyl-1-butene, 5-cyclohexyl-1-pentene, 6-cyclohexyl-1-hexene, etc. While most of the aforementioned compounds denote normal olefinic hydrocarbons, it is to be understood that the compounds so listed are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example a mixture of 0.05 mole of n-octyl phenyl sulfide and 0.05 mole of piperidine was placed in the glass liner of a rotating autoclave along with 2 grams of a catalyst comprising nickel composited on kieselguhr. The liner was sealed into the autoclave and nitrogen pressed in until an initial pressure of 30 atmospheres was reached. Thereafter, the autoclave and contents thereof were heated to a temperature of 300° C. and maintained thereat for a period of 1 hour. At the end of this time, heating was discontinued and the autoclave was allowed to return to room temperature. The excess pressure was discharged and the autoclave opened. The reaction mixture was recovered from the liner and separated from the catalyst by means of filtration. The remainder of the reaction mixture was then subjected to fractional distillation and the desired product comprising essentially pure 1-octene was recovered therefrom.

EXAMPLE II

In this example a mixture of 0.1 mole of n-octyl phenyl sulfide and 0.1 mole of pyridine was placed in the glass liner of a rotating autoclave along with 2 grams of a catalyst comprising nickel composited on kieselguhr. The liner was sealed into the autoclave and nitrogen pressed in until an initial pressure of 40 atmospheres was reached. Thereafter, the autoclave and contents thereof was heated to a temperature of 300° C. and maintained thereat for a period of 2 hours. Following the completion of the residence time, the autoclave was cooled to room temperature. The pressure was released and the autoclave opened, the reaction mixture was recovered and separated from the catalyst. The remainder of the reaction mixture was then subjected to fractional distillation and the desired product comprising essentially pure 1-octene was recovered.

EXAMPLE III

A mixture comprising 0.1 mole of n-decyl benzyl sulfide and 0.1 mole of triethyl amine is placed in the glass liner of a rotating autoclave along with 5 grams of a catalyst comprising nickel composited on kieselguhr. The liner is sealed into the autoclave and nitrogen pressed in until an initial pressure of 40 atmospheres is reached. Following this, the autoclave is heated to a temperature of about 350° C. and maintained thereat for a period of 3 hours. At the end of this time, heating is discontinued, the autoclave is allowed to return to room temperature, and the excess pressure is discharged. Upon opening the autoclave, the reaction mixture is recovered and separated from the catalyst by means of filtration. The liquid reaction product is subjected to fractional distillation whereby the desired product comprising 1-decene is separated and recovered therefrom.

EXAMPLE IV

In this example 0.05 mole of 1-methylbutyl methyl sulfide and 0.05 mole of piperidine are treated in a manner similar to that set forth in the above examples, that is, the mixture is placed in a rotating autoclave along with 2 grams of a catalyst comprising cobalt composited on kieselguhr. After sealing the autoclave and pressuring the same by means of nitrogen to an initial pressure of 25 atmospheres, the apparatus is heated to a temperature of 300° C. and maintained thereat for a period of 2 hours. Following the completion of the desired residence time, the autoclave is cooled to room temperature and the excess pressure is discharged. After opening the autoclave, the reaction mixture is separated from the catalyst and subjected to fractional distillation under reduced pressure whereby the desired product comprising 2-pentene is separated and recovered.

EXAMPLE V

A mixture of 0.05 mole of n-tetradecylphenyl sulfide and 0.05 mole of piperidine along with 2 grams of a catalyst comprising nickel composited on kieselguhr is sealed into a rotating autoclave which is thereafter pressurized with nitrogen until an initial pressure of 40 atmospheres is reached. The autoclave and contents thereof are then heated to a temperature of 280° C. and maintained thereat for a period of 3 hours. Following the completion of the residence time, the autoclave is cooled to room temperature and the excess pressure is discharged. The autoclave is opened and the reaction mixture is recovered therefrom. The reaction product is separated from the catalyst by filtration and subjected to fractional distillation under reduced pressure whereby the desired product comprising 1-tetradecene is separated and recovered.

EXAMPLE VI

A mixture comprising 0.1 mole of di-sec-octyl sulfide, 0.1 mole of triethyl amine, and 2 grams of a catalyst comprising cobalt composited on kieselguhr is placed in an autoclave and treated in a manner similar to that set forth in the above examples. After reaching operating conditions of a pressure of 50 atmospheres and a reaction temperature of 325° C., the autoclave is maintained thereat for a period of 2 hours. Following completion of the residence time, the autoclave is allowed to return to room temperature and the excess pressure is discharged. After opening the autoclave, the reaction product is separated from the catalyst and treated in a manner hereinbefore set forth. The desired product comprising 2-octene is recovered from the fractional distillation.

I claim as my invention:

1. A process for the preparation of an olefinic hydrocarbon which comprises treating an organic sulfide at an elevated temperature in the range of from about 250° C. to about 400° C. in the presence of an amine compound of the group consisting of aliphatic and cyclic amines including primary, secondary and tertiary amines, pyrazole, triazole, diazines, triazines, pyridine, piperidine, analine, quinoline, carbazole, indole, and morpholine and a catalyst containing a Group VIII metal, and recovering the resultant olefinic hydrocarbon.

2. The process as set forth in claim 1 in which said catalyst comprises nickel composited on kieselguhr.

3. The process as set forth in claim 1 in which said catalyst comprises cobalt composited on kieselguhr.

4. The process as set forth in claim 1 in which said amine compound comprises piperidine.

5. The process as set forth in claim 1 in which said amine compound comprises pyridine.

6. The process as set forth in claim 1 in which said organic sulfide is n-octyl phenyl sulfide and said olefinic hydrocarbon is 1-octene.

7. The process as set forth in claim 1 in which said organic sulfide is n-decyl benzyl sulfide and said olefinic hydrocarbon is 1-decene.

8. The process as set forth in claim 1 in which said organic sulfide is 1-methylbutyl methyl sulfide and said olefinic hydrocarbon is 2-pentene.

9. The process as set forth in claim 1 in which said organic sulfide is n-tetradecyl phenyl sulfide and said olefinic hydrocarbon is 1-tetradecene.

10. The process as set forth in claim 1 in which said organic sulfide is di-sec-octyl sulfide and said olefinic hydrocarbon is 2-octene.

References Cited

UNITED STATES PATENTS 3,254,131   8/1961   Landis et al. _____ 260—613

DELBERT E. GANTZ, Primary Examiner

J. M. NELSON, Assistant Examiner

U.S. Cl. X.R.

260—609